(12) United States Patent
Madkour

(10) Patent No.: US 11,803,418 B2
(45) Date of Patent: *Oct. 31, 2023

(54) ON-DEMAND CLOUD ROBOTS FOR ROBOTIC PROCESS AUTOMATION

(71) Applicant: UiPath, Inc., New York, NY (US)

(72) Inventor: Tarek Madkour, Sammamish, WA (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,177

(22) Filed: Mar. 17, 2022

(65) Prior Publication Data

US 2022/0206848 A1 Jun. 30, 2022

Related U.S. Application Data

(63) Continuation of application No. 16/725,706, filed on Dec. 23, 2019, now Pat. No. 11,321,124.

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/505* (2013.01); *G06F 9/5055* (2013.01)

(58) Field of Classification Search
CPC ....... G06F 9/4881; G06F 9/505; G06F 9/5055
See application file for complete search history.

(56) References Cited

U.S. PATENT DOCUMENTS

| 7,861,252 | B2 | 12/2010 | Uszok et al. |
| 8,793,684 | B2 | 7/2014 | Breitgand et al. |
| 9,876,676 | B1 | 1/2018 | Sandham |
| 10,042,657 | B1 | 8/2018 | Lauinger et al. |
| 10,248,445 | B2 | 4/2019 | Khandekar et al. |
| 10,264,058 | B1 | 4/2019 | Lauinger et al. |
| 10,860,905 | B1 | 12/2020 | Gligan et al. |
| 2010/0153482 | A1 | 6/2010 | Kim et al. |
| 2010/0299366 | A1 | 11/2010 | Stienhans et al. |
| 2015/0081885 | A1 | 3/2015 | Thomas et al. |
| 2016/0294643 | A1 | 10/2016 | Kim |
| 2017/0199770 | A1 | 7/2017 | Peteva et al. |
| 2018/0089698 | A1 | 3/2018 | Campana et al. |
| 2018/0189093 | A1 | 7/2018 | Agarwal et al. |

(Continued)

FOREIGN PATENT DOCUMENTS

CN 109636504 A 4/2019

OTHER PUBLICATIONS

Extended European Search Report dated May 6, 2022, in connection with European Patent Application No. 21215084.1, 10 pgs.

(Continued)

*Primary Examiner* — Gregory A Kessler
(74) *Attorney, Agent, or Firm* — CHIESA SHAHINIAN & GIANTOMASI PC

(57) ABSTRACT

Systems and methods for implementing robotic process automation (RPA) in the cloud are provided. An instruction for managing an RPA robot is received at an orchestrator in a cloud computing environment from a user in a local computing environment. In response to receiving the instruction, the instruction for managing the RPA robot is effectuated.

27 Claims, 6 Drawing Sheets

500

(56) References Cited

U.S. PATENT DOCUMENTS

| | | | |
|---|---|---|---|
| 2018/0203994 A1 | 7/2018 | Shukla et al. | |
| 2018/0341527 A1 | 11/2018 | Ikkaku et al. | |
| 2019/0155225 A1 | 5/2019 | Kothandaraman et al. | |
| 2019/0303779 A1 | 10/2019 | Van Briggle et al. | |
| 2020/0364083 A1* | 11/2020 | Walby ................ | G06Q 10/0631 |

OTHER PUBLICATIONS

"AutomationEdge RPA on Cloud," retrieved online on Dec. 6, 2019, at https://automationedge.com/product/rpa-on-cloud/, 5 pgs.

"RPA as a Service," Jul. 25, 2019, retrieved online on Dec. 6, 2019, at https://www.lateetud.com/blogs/rpa-as-a-service-, 5 pgs.

Zullo et al., "Robotics (RPA) as a Service," Jun. 11, 2019, at https://www.eisneramper.com/robotics-rpa-cloud-computing-prts-0619/, 4 pgs.

"A Virtual Workforce in One Intelligent Automation Product," retrieved online on Dec. 6, 2019, at https://thoughtonomy.com/intelligent-automation, 7 pgs.

International Search Report and Written Opinion dated Dec. 22, 2020, in connection with International Patent Application No. PCT/US2020/049300, filed Sep. 4, 2020, 10 pgs.

"Automation Edge Industry's First RPA On Cloud Solution," screenshots from video posted on https://www.youtube.com/watch?v=u_d2SX2Mjl&feature=emb_logo, Jul. 18, 2019.

"Blue Prism Azure Trial," retrieved online on Apr. 16, 2020, from https://digitalexchange.blueprism.com/dx/entry/3439/solution/blue-prism-on-azure-marketplace, 5 Pgs.

"CloudShell Pro Overview," retrieved online on Apr. 16, 2020, from https://info.quali.com/hubfs/CloudShell%20Pro%20Datasheet.pdf, 2 pgs.

"Quali Joins Google Cloud Partnership Ecosystem," retrieved online on Dec. 10, 2019 from https://www.prweb.com/releases/quali_joins_google_cloud_partnership_ecosystem/prweb16749139.htm, 2 pgs.

"Virsoft Solution Demo as a Service", Aug. 30, 2012, screenshots from video posted on https://www.youtube.com/watch?v=ISfwkgKQ9z4, 58 pgs.

VIRSOFT.net, "Demo as a Service," retrieved online on Apr. 16, 2020 from https://virsoft.sharepoint.com/Documents/Virsoft%20Datasheet%20for%20web.pdf, 2 pgs.

"Robotic Process Automation (RPA) : Cloud Vs On-Premises", 2019, XP055887589, Retrieved online on Feb. 4, 2022, from: https://digitalworkforce.com/rpa-news/robotic-process-automation-cloud-vs-premis es/, 5 pgs.

"Scaling RPA—Best Technological Practices to Scale RPA," 2019, XP055887671, Retrieved online on Feb. 4, 2022, from: https://digitalworkforce.com/rpa-news/ scaling-rpa-best-technological-practices-to-scale-enterprise-robotic-process-automation/, 5 pgs.

Extended European Search Report dated Feb. 16, 2022, in connection with European Patent Application No. 20808274.3, filed Sep. 4, 2020, 10 pgs.

* cited by examiner

ON-DEMAND CLOUD ROBOTS FOR ROBOTIC PROCESS AUTOMATION

This application is a continuation of U.S. patent application Ser. No. 16/725,706, filed Dec. 23, 2019, the disclosure of which is incorporated herein by reference in its entirety.

TECHNICAL FIELD

The present invention relates generally to robotic process automation, and more particularly to on-demand cloud robots for robotic process automation.

BACKGROUND

Robotic process automation (RPA) is a form of process automation that uses software robots to automate workflows. Typically, RPA is implemented for an enterprise on a local computing infrastructure that is managed by the enterprise. However, such local implementation of RPA requires the maintenance of a large computing infrastructure for provisioning servers that are continuously running. Recently, cloud computing technology has been leveraged to implement robots in the cloud. However, the cost of maintaining continuously running robots in the cloud is prohibitive.

BRIEF SUMMARY OF THE INVENTION

In accordance with one or more embodiments, systems and methods for cloud-based management of robotic process automation (RPA) robots are provided. An instruction for managing an RPA robot is received at an orchestrator in a cloud computing environment from a user in a local computing environment. The instruction may include an instruction for creating the RPA robot, provisioning the RPA robot, scheduling a task on the RPA robot, or decommissioning the RPA robot. In response to receiving the instruction, the instruction for managing the RPA robot is effectuated.

In one embodiment, where the instruction for managing the RPA robot is an instruction for creating the RPA robot, the instruction is effectuated by creating the RPA robot for execution in a cloud network managed by the user in the cloud computing environment, creating the RPA robot for execution in a cloud network managed by a cloud service provider (associated with the orchestrator) in the cloud computing environment, or by creating the RPA robot for execution in a local network managed by the user in the local computing environment.

In one embodiment, the RPA robot is for performing tasks in the cloud computing environment and transmitting results of the tasks to the local computing environment. The RPA robot is in a standby mode having reduced operating costs when the RPA robot is not performing a task.

In accordance with one embodiment, systems and methods for cloud-based management of robotic process automation (RPA) robots are provided. A cloud robot pool is maintained in a cloud computing environment. The cloud robot pool includes one or more cloud RPA robots for performing a task in a cloud computing environment for a user in a local computing environment. The cloud robot pool is managed using a cloud orchestrator implemented in the cloud computing environment.

In one embodiment, managing the cloud robot pool includes one or more of creating a new cloud RPA robot in the cloud robot pool, provisioning the one or more cloud RPA robots, scheduling a task on the one or more cloud RPA robots, or decommissioning the one or more cloud RPA robots.

In one embodiment, the cloud robot pool includes a cloud managed robot pool comprising one or more cloud managed RPA robots executed in a cloud network managed by the user or a cloud service robot pool comprising one or more cloud service RPA robots executed in a cloud network managed by a cloud service provider. The one or more cloud RPA robots are in a standby mode having reduced operating costs when the one or more cloud RPA robots are not performing a task. In one embodiment, a local robot pool comprising one or more local RPA robots executed in a local network managed by the user is also maintained.

These and other advantages of the invention will be apparent to those of ordinary skill in the art by reference to the following detailed description and the accompanying drawings.

DETAILED DESCRIPTION

Figure 1:
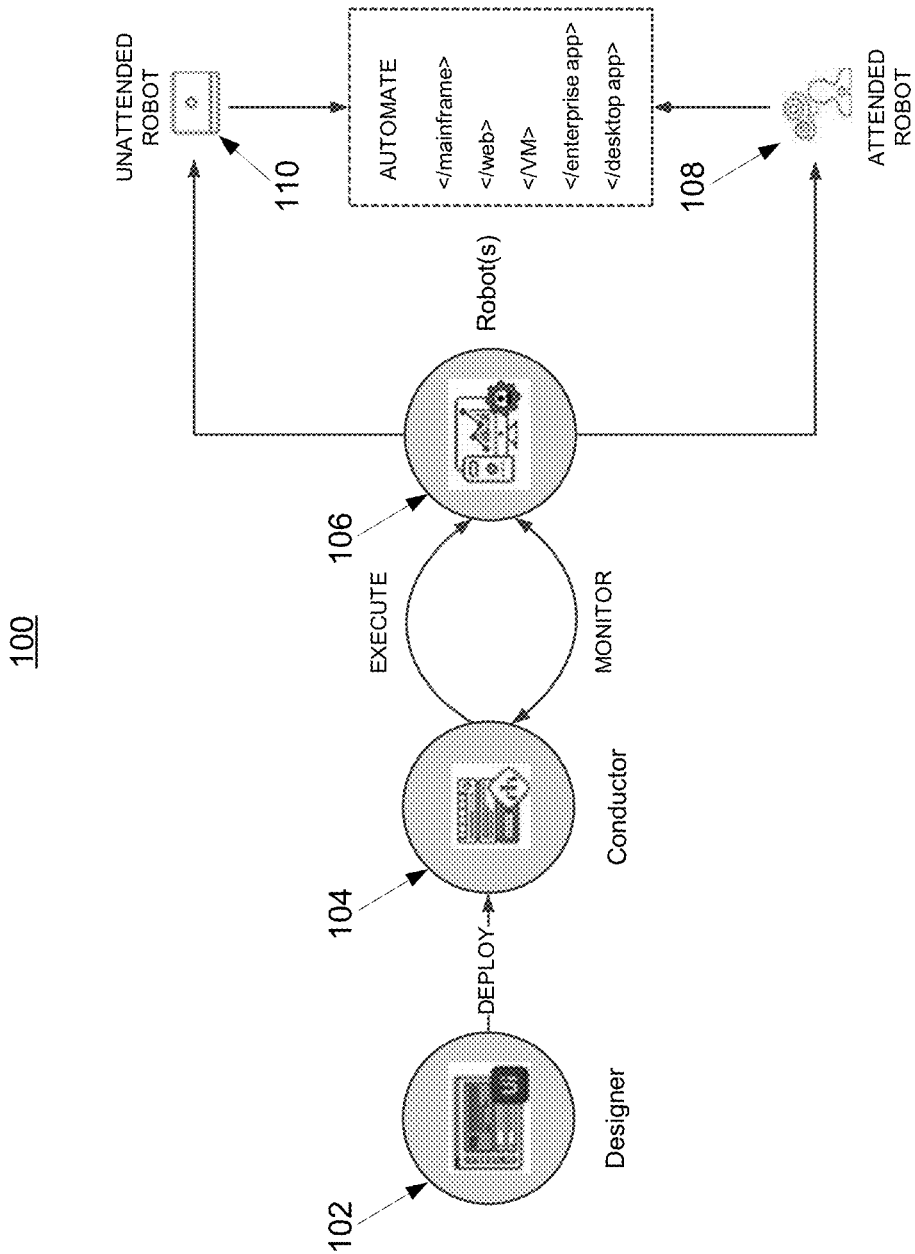
FIG. 1 is an architectural diagram illustrating a robotic process automation system, according to an embodiment of the invention.

Robotic process automation (RPA) is used for automating various tasks and workflows. FIG. 1 is an architectural diagram of an RPA system 100, in accordance with one or more embodiments. As shown in FIG. 1, RPA system 100 includes a designer 102 to allow a developer to design automation processes using workflows. More specifically, designer 102 facilitates the development and deployment of workflows and robots for performing activities in the workflows. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 102, execution of business processes is orchestrated by a conductor 104, which orchestrates one or more robots 106 that execute the workflows developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run workflows built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
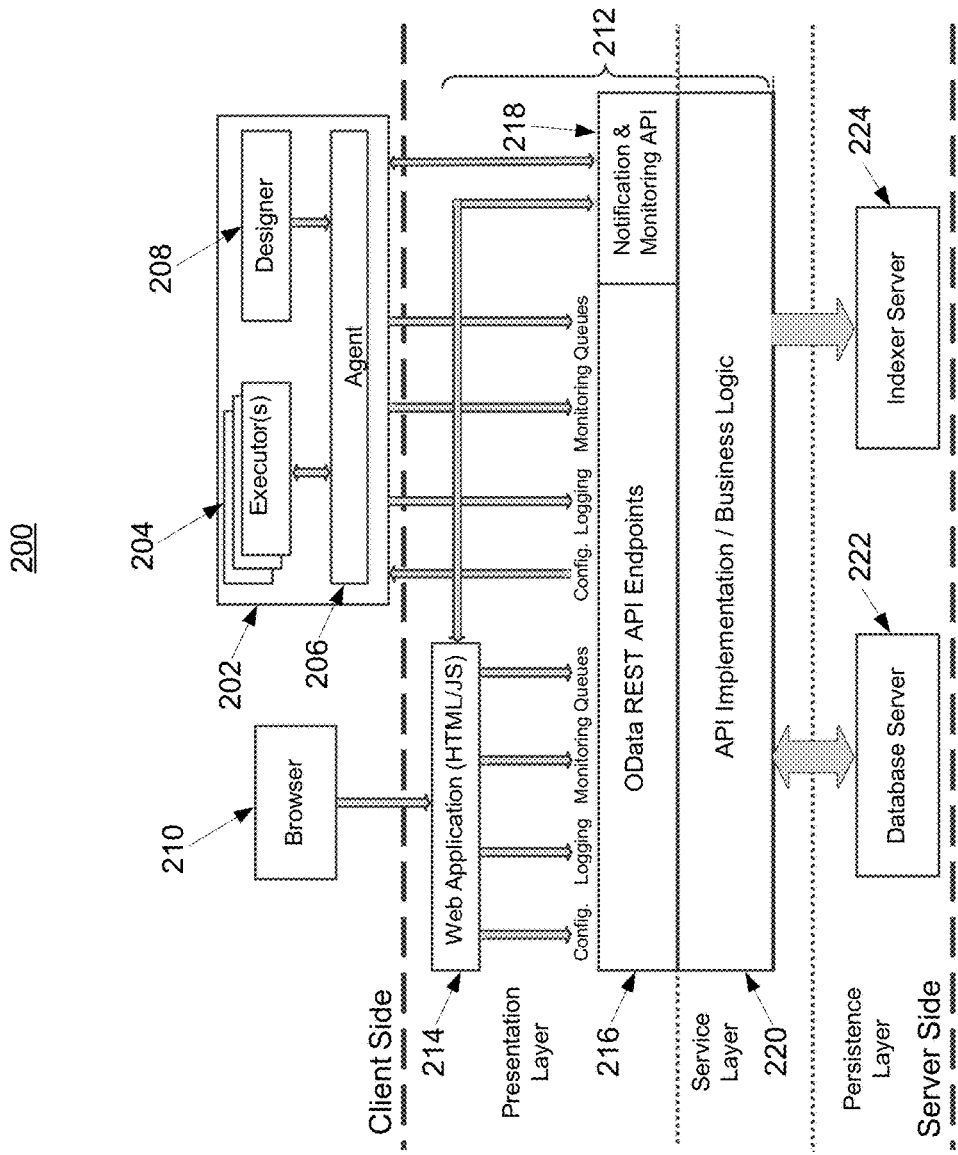
FIG. 2 is an architectural diagram illustrating an example of a deployed robotic process automation system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
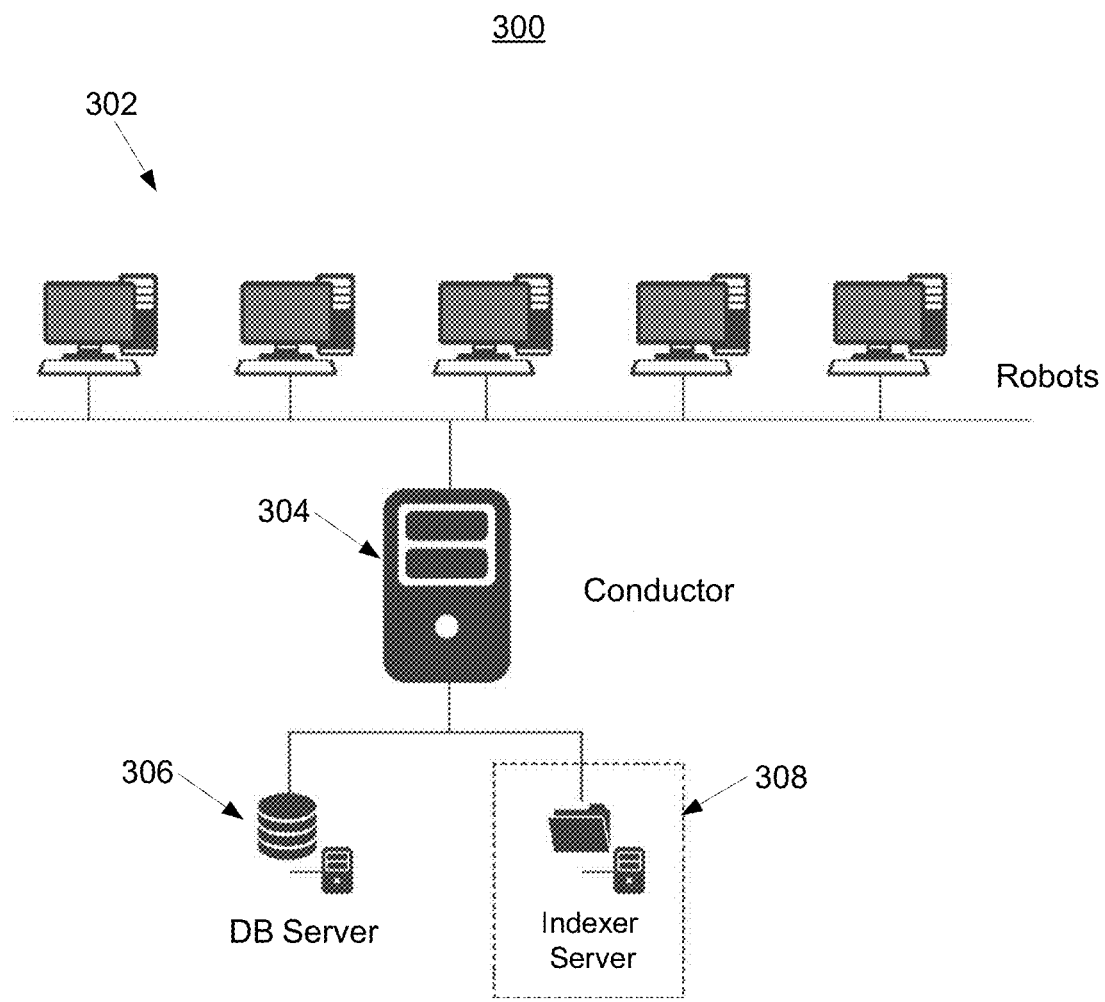
FIG. 3 is an architectural diagram illustrating a simplified deployment example of a robotic process automation system, according to an embodiment of the invention.

FIG. 3 is an architectural diagram illustrating a simplified deployment example of RPA system 300, in accordance with one or more embodiments. In some embodiments, RPA system 300 may be, or may include RPA systems 100 and/or 200 of FIGS. 1 and 2, respective. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 300 may be implemented for cloud-based management of RPA robots. Such cloud-based management of RPA robots enables RPA to be provided as Software as a Service (SaaS). Accordingly, conductor 304 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
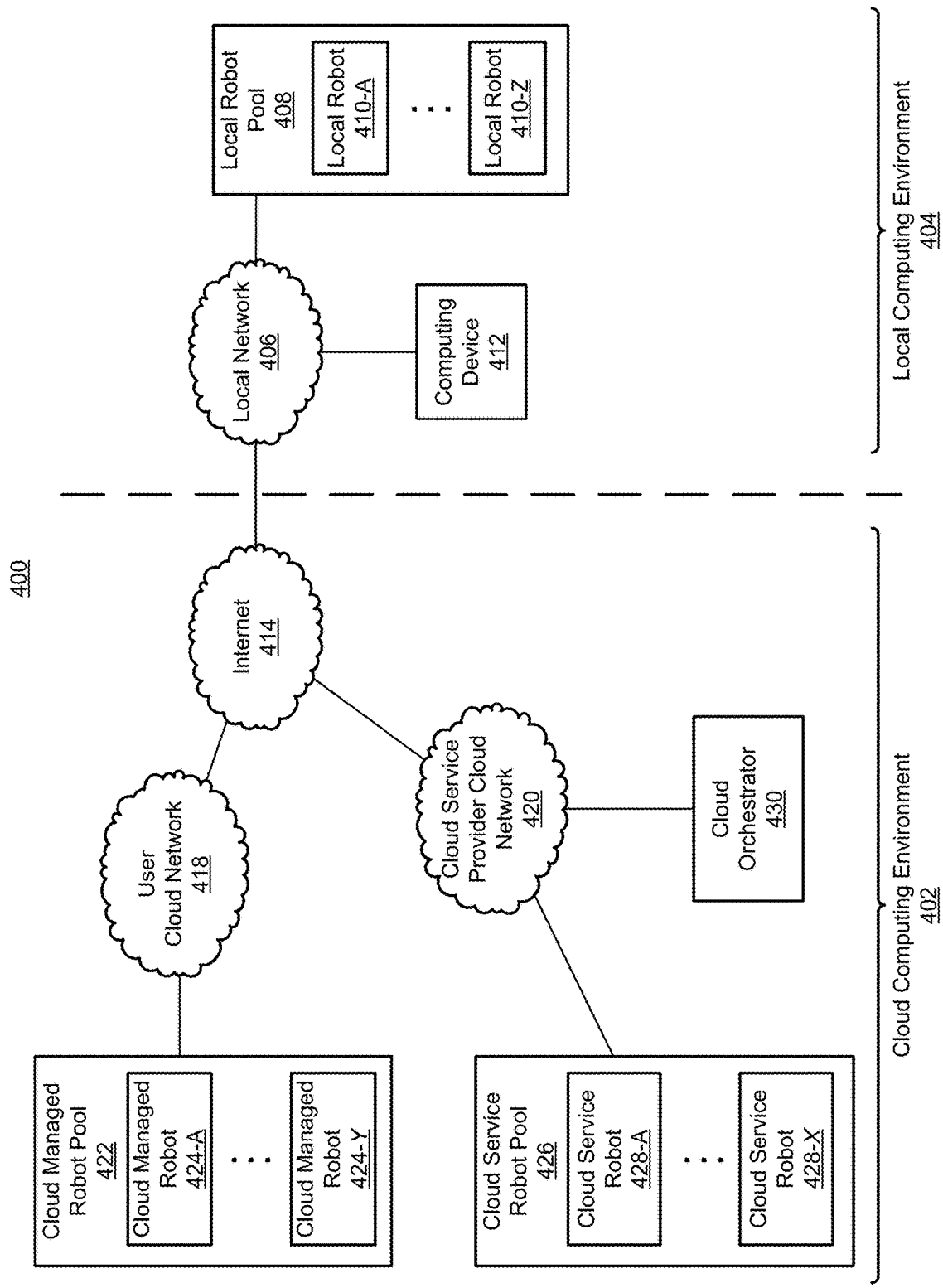
FIG. 4 shows a network architecture for implementing cloud-based management of robotic process automation robots, according to an embodiment of the invention.

FIG. 4 shows a network architecture 400 for implementing cloud-based management of RPA robots, in accordance with one or more embodiments. Network architecture 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 also facilitates secure access control and manages robot licenses. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, . . . , 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud service robot pool 426 is maintained by the cloud service provider in cloud service provider cloud network 420 to include cloud service robots of different types. For example, cloud service robot pool 426 may include standard robots or custom robots. Standard robots are defined by the user using standard machine templates, which provide a standard predetermined set of software to the robots. Standard robots may be, e.g., machines with only a standard browser used for web automation, machines with an operating system installed for performing virtual desktop infrastructure (VDI) automation, machines with standard applications for performing desktop automation, or a combination thereof. Custom robots are defined by the user using custom machine templates, which provide a custom set of software to the robots. The custom machine templates may be uploaded by the user as a machine image for the cloud service provider to use when creating the custom robots. Custom machine images may include proprietary software that is owned by the user or special-licensed applications that were purchased by the user. Standard and custom robots are used to run automations (processes) that were submitted to cloud orchestrator 430. Cloud orchestrator 430 awaits instructions to execute automations from either: a) the user directly through manual invocation, or b) through previously scheduled regular automations. Once cloud orchestrator 430 is ready to execute an automation, it inspects the type of process and identifies whether it needs a standard robot or a custom robot to execute that automation. Once the robot type is identified, cloud orchestrator 430 inspects robot pools available for that robot type to find an available robot that is already running or an available robot that is almost finished with a job. If a robot of that type is already running, cloud orchestrator 430 will utilize that robot to avoid starting a new robot unnecessarily in an effort to minimize costs. If no robots are running, it will start a robot that is on standby and submit the job request to that robot.

In one embodiment, algorithms may be applied to maximize the utilization of the robots in cloud service robot pool 426 and to reduce operating costs for the user. Cloud orchestrator 430 will look ahead at the upcoming planned schedule of automation and optimize a plan for how to parallelize and queue automations so that they run on the minimum number of robots. Once the schedule is defined, cloud orchestrator 430 will use the schedule to run automations. Additionally, cloud orchestrator 430 will be constantly monitoring the state of running robots and modify the planned schedule based on real-measured execution of the robots. This results in maximizing the utilization of the running robots and reducing the costs of running additional robots.

In one embodiment, cloud service robot pool 426 may service multiple users in a multi-tenant environment.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity. Local robots 410 are configured using a secure network key that the user extracts from the user interface of cloud orchestrator 430. Using that secure key, local robots 410 reach out to cloud orchestrator 430 and establish a secure connection. All traffic happens as outbound requests from the local robots 410. This minimizes the need for inbound connectivity from the cloud to local network 406 which improves security.

Figure 5:
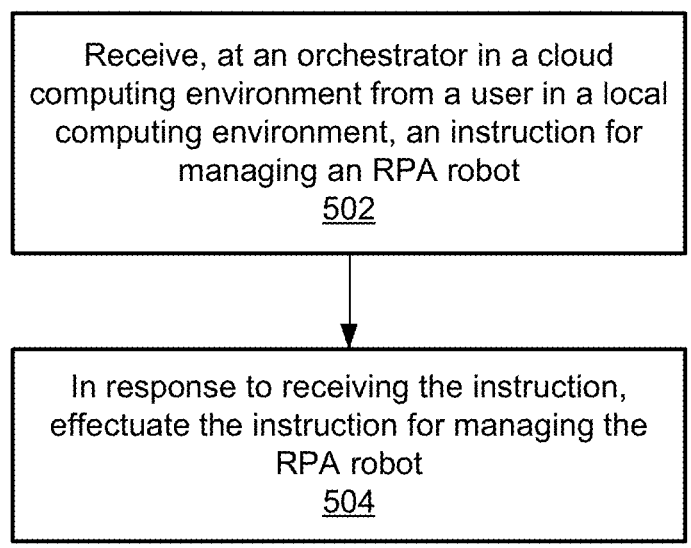
FIG. 5 shows a method for cloud-based management of robotic process automation robots, according to an embodiment of the invention.

FIG. 5 shows a method 500 for cloud-based management of RPA robots, in accordance with one or more embodiments. Method 500 will be described with continued reference to network architecture 400 of FIG. 4. In one embodiment, the steps of method 500 are performed by cloud orchestrator 430.

At step 502, an instruction for managing an RPA robot is received at an orchestrator 430 in a cloud computing environment 402 from a user in a local computing environment 404. The instruction for managing the RPA robot may include, for example, an instruction for creating the RPA robot, provisioning the RPA robot, scheduling a task on the RPA robot, and/or decommissioning the RPA robot. The RPA robot may include local robots 410, cloud managed robots 424, or cloud service robots 428. The cloud managed robots 424 and cloud service robots 428 are for performing RPA tasks in the cloud computing environment and transmitting results of the RPA tasks to the user in the local computing environment 404. While not performing a task, the RPA robots are in a standby mode having reduced operating costs.

At step 504, in response to receiving the instruction, the instruction for managing the RPA robot is effectuated. In one embodiment, where the instruction for managing the RPA robot is an instruction for creating the RPA robot, the instruction is effectuated by creating the RPA robot for execution in a cloud network 418 managed by the user in the cloud computing environment 402, by creating the RPA robot for execution in a cloud network 420 managed by a cloud service provider (associated with the cloud orchestrator 430) in the cloud computing environment 402, or by creating the RPA robot for execution in a local network 406 managed by the user in the local computing environment 404.

Advantageously, embodiments of the present invention enable RPA as a SaaS. Such SaaS RPA enables users to create and scale the number of robots on demand for automating tasks using the cloud, for example, during a time period of peak usage. Such SaaS RPA lowers the total cost of ownership for the user by reducing cloud operating costs, simplifies the network infrastructure required to implement RPA, and enables a secure cloud-based infrastructure for implementing RPA.

One illustrative application of embodiments of the present invention will be described with reference to FIG. 4. An airline company may utilize RPA robots for customer service to modify airline bookings. The airline company provisions ten RPA robots as local robots 410 on a local computing environment 404, which is sufficient for handling customer service at a regular load. Occasionally, the airline company will have an emergency, such as, e.g., a thunderstorm at one of their hubs that may require grounding a few hundred airplanes within a time period of a few hours, resulting in tens of thousands of customers stranded at airports and attempting to reschedule their flights. Customer service representatives at the airport and the ten RPA robots are unable to handle this additional load. Advantageously, embodiments of the present invention enable the airline company to scale up the number of RPA robots to a few hundred RPA robots as cloud service robots 428 to help serve the stranded customers immediately. The airline company is able to scale the number of RPA robots without having to manage the infrastructure for the additional RPA robots or having to provision the RPA robots for peak capacity during normal operation times. Further, the airline company would only pay for the additional RPA robots during peak usage, thereby reducing costs.

Figure 6:
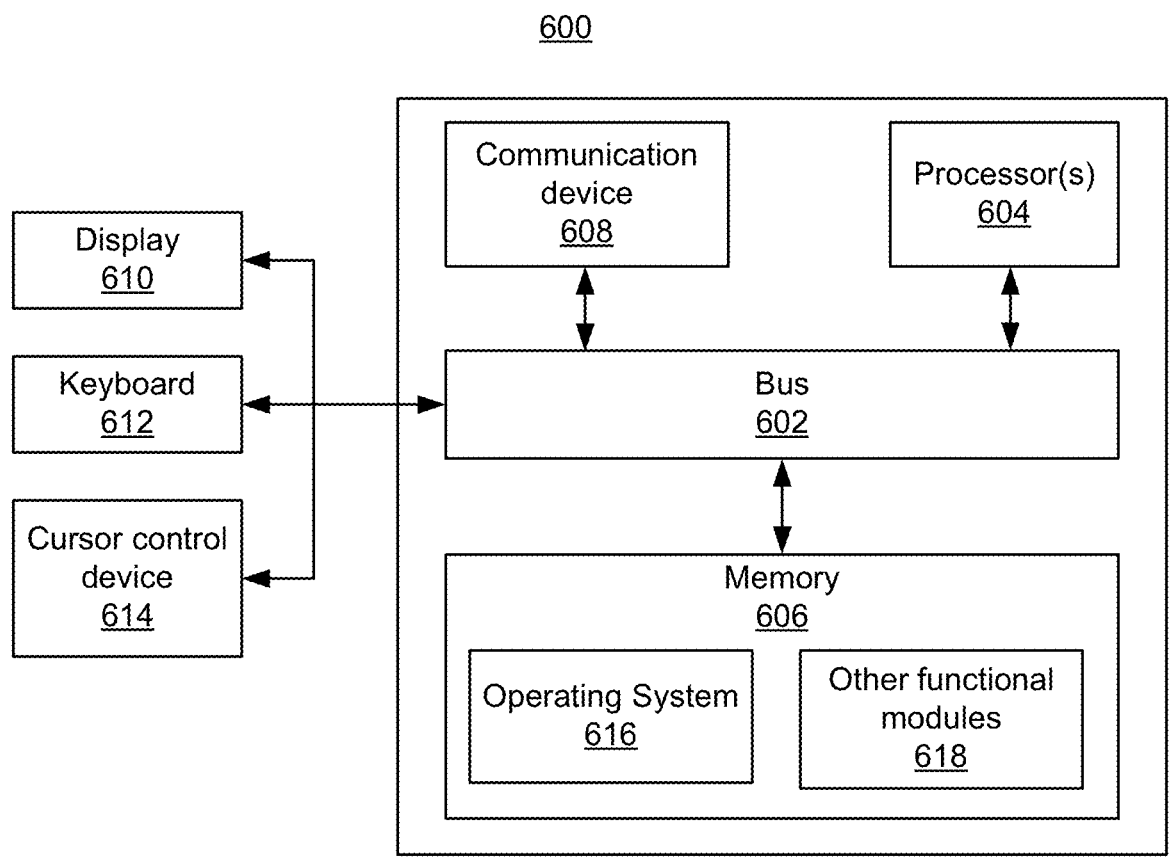
FIG. 6 is a block diagram of a computing system according to an embodiment of the invention.

FIG. 6 is a block diagram illustrating a computing system 600 configured to execute the methods described in reference to FIG. 5, according to an embodiment of the present invention. In some embodiments, computing system 600 may be one or more of the computing systems depicted and/or described herein, such as, e.g., conductor 104, robots 106, unattended robot 110, and attended robot 108 of FIG. 1, conductor 212 of FIG. 2, robots 302 and conductor 304 of FIG. 3, and local robots 410, computing device 412, cloud managed robots 424, cloud service robots 428, and cloud orchestrator 430 of FIG. 4. Computing system 600 includes a bus 602 or other communication mechanism for communicating information, and processor(s) 604 coupled to bus 602 for processing information. Processor(s) 604 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 604 may also have multiple processing cores, and at least some of the cores may be configured to perform specific functions. Multi-parallel processing may be used in some embodiments.

Computing system 600 further includes a memory 606 for storing information and instructions to be executed by processor(s) 604. Memory 606 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 604 and may include volatile media, non-volatile media, or both. The media may also be removable, non-removable, or both.

Additionally, computing system 600 includes a communication device 608, such as a transceiver, to provide access to a communications network via a wireless and/or wired connection according to any currently existing or future-implemented communications standard and/or protocol.

Processor(s) 604 are further coupled via bus 602 to a display 610 that is suitable for displaying information to a user. Display 610 may also be configured as a touch display and/or any suitable haptic I/O device.

A keyboard 612 and a cursor control device 614, such as a computer mouse, a touchpad, etc., are further coupled to bus 602 to enable a user to interface with computing system. However, in certain embodiments, a physical keyboard and mouse may not be present, and the user may interact with the device solely through display 610 and/or a touchpad (not shown). Any type and combination of input devices may be used as a matter of design choice. In certain embodiments, no physical input device and/or display is present. For instance, the user may interact with computing system 600 remotely via another computing system in communication therewith, or computing system 600 may operate autonomously.

Memory 606 stores software modules that provide functionality when executed by processor(s) 604. The modules include an operating system 616 for computing system 600 and one or more additional functional modules 618 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
   receiving, at an orchestrator in a provider cloud network, an instruction from a computing device in a local computing environment for managing a robotic process automation (RPA) robot using a connection established between the provider cloud network and the local computing environment via a user cloud network; and
   effectuating, by the orchestrator, the instruction for managing the RPA robot in response to receiving the instruction.

2. The computer-implemented method of claim 1, wherein the instruction for managing the RPA robot comprises an instruction for creating the RPA robot.

3. The computer-implemented method of claim 2, wherein effectuating the instruction for managing the RPA robot comprises:
   creating the RPA robot in the user cloud network, the user cloud network managed by a user.

4. The computer-implemented method of claim 2, wherein effectuating the instruction for managing the RPA robot comprises:
   creating the RPA robot in the provider cloud network, the provider cloud network managed by a cloud service provider.

5. The computer-implemented method of claim 1, wherein the instruction for managing the RPA robot comprises an instruction for provisioning the RPA robot.

6. The computer-implemented method of claim 1, wherein the instruction for managing the RPA robot comprises an instruction for scheduling a task on the RPA robot.

7. The computer-implemented method of claim 1, wherein the instruction for managing the RPA robot comprises an instruction for decommissioning the RPA robot.

8. The computer-implemented method of claim 1, further comprising:
executing a task by the RPA robot executing in at least one of the provider cloud network or the user cloud network; and
transmitting, to the computing device, results of the task from the RPA robot executing in the at least one of the provider cloud network or the user cloud network.

9. The computer-implemented method of claim 1, wherein the RPA robot is in a standby mode having reduced operating costs when the RPA robot is not performing a task.

10. A cloud computing environment comprising:
a processor;
a memory;
a cloud robot pool comprising one or more robotic process automation (RPA) robots; and
a cloud orchestrator, executing in a provider cloud network, configured to:
receive an instruction from a computing device in a local computing environment for managing the cloud robot pool using a connection established between the provider cloud network and the local computing environment via a user cloud network, and
effectuate the instruction for managing the cloud robot pool in response to receiving the instruction.

11. The cloud computing environment of claim 10, wherein the instruction for managing the cloud robot pool comprises an instruction for creating the one or more RPA robots.

12. The cloud computing environment of claim 11, wherein effectuating the instruction for managing the cloud robot pool comprises:
creating the one or more RPA robots in the user cloud network, the user cloud network managed by a user.

13. The cloud computing environment of claim 11, wherein effectuating the instruction for managing the cloud robot pool comprises:
creating the one or more RPA robots in the provider cloud network, the provider cloud network managed by a cloud service provider.

14. The cloud computing environment of claim 10, wherein the instruction for managing the cloud robot pool comprises an instruction for provisioning the one or more RPA robots.

15. The cloud computing environment of claim 10, wherein the instruction for managing the cloud robot pool comprises an instruction for scheduling a task on the one or more RPA robots.

16. The cloud computing environment of claim 10, wherein the instruction for managing the cloud robot pool comprises an instruction for decommissioning the one or more RPA robots.

17. The cloud computing environment of claim 10, wherein the one or more RPA robots are configured to:
execute a task in at least one of the provider cloud network or the user cloud network; and
transmit, to the computing device, results of the task.

18. The cloud computing environment of claim 11, wherein the one or more RPA robots are in a standby mode having reduced operating costs when the one or more RPA robots are not performing a task.

19. A computer-implemented method comprising:
maintaining a cloud robot pool comprising one or more robotic process automation (RPA) robots; and
managing the cloud robot pool using a cloud orchestrator implemented in a provider cloud network, the cloud orchestrator:
receiving an instruction from a computing device in a local computing environment for managing the cloud robot pool using a connection established between the provider cloud network and the local computing environment via a user cloud network, and
effectuating the instruction for managing the cloud robot pool in response to receiving the instruction.

20. The computer-implemented method of claim 19, wherein the instruction comprises an instruction for creating the one or more RPA robots.

21. The computer-implemented method of claim 20, wherein effectuating an instruction for managing the one or more RPA robots comprises:
creating the one or more RPA robots in the user cloud network, the user cloud network managed by a user.

22. The computer-implemented method of claim 20, wherein effectuating an instruction for managing the one or more RPA robots comprises:
creating the one or more RPA robots in the provider cloud network, the provider cloud network managed by a cloud service provider.

23. The computer-implemented method of claim 19, wherein the instruction for managing the one or more RPA robots comprises an instruction for provisioning the one or more RPA robots.

24. The computer-implemented method of claim 19, wherein the instruction for managing the one or more RPA robots comprises an instruction for scheduling a task on the one or more RPA robots.

25. The computer-implemented method of claim 19, wherein the instruction for managing the one or more RPA robots comprises an instruction for decommissioning the one or more RPA robots.

26. The computer-implemented method of claim 19, further comprising:
executing a task, by the one or more RPA robots, in the at least one of the provider cloud network or the user cloud network; and
transmitting, from the one or more RPA robots to the computing device, results of the task.

27. The computer-implemented method of claim 19, wherein the one or more RPA robots are in a standby mode having reduced operating costs when the one or more RPA robots are not performing a task.

* * * * *